Aug. 19, 1958  R. M. CARRIER, JR  2,847,767
SPIRAL CONVEYORS
Filed April 29, 1952  2 Sheets-Sheet 1

INVENTOR.
ROBERT M. CARRIER JR.
BY
Oberlin & Limbach
ATTORNEYS

Aug. 19, 1958 R. M. CARRIER, JR 2,847,767
SPIRAL CONVEYORS
Filed April 29, 1952 2 Sheets-Sheet 2

INVENTOR.
ROBERT M. CARRIER JR.
BY
Oberlin & Limbach
ATTORNEYS

United States Patent Office 2,847,767
Patented Aug. 19, 1958

2,847,767
SPIRAL CONVEYORS
Robert M. Carrier, Jr., Louisville, Ky.
Application April 29, 1952, Serial No. 285,020
3 Claims. (Cl. 34—164)

The present invention relates generally as indicated to spiral conveyors and more particularly to spiral conveyors which have unique forms of helical material supporting pans or flights for effecting special treatment of the conveyed material during the course of its travel upward around such pans or flights.

It is one object of this invention to provide a spiral conveyor having a plurality of concentrically disposed flights arranged so that different materials may be conveyed thereby or so that the same material may be successively conveyed, first up one flight, down the center tube of the conveyor, and up another flight.

Another object of this invention is to provide a spiral conveyor which has multiple flights for conveying different materials; for conveying one material up one flight, down the center tube of the conveyor, and up another flight; for coolant spraying of the underside of one flight while utilizing the flight therebeneath as a trough for the discharge of the sprayed liquid; and for scalp screening wherein a portion of the top flight is a screen.

It is another object of this invention to provide a spiral conveyor operative to ventilate or cool the material being conveyed by the provision of perforations in the center tube located above material supporting surface of the helical pan.

Other objects and advantages will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 4:
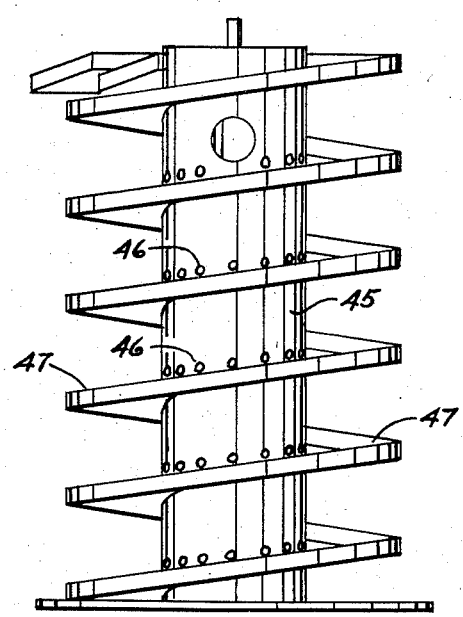
Figure 5:
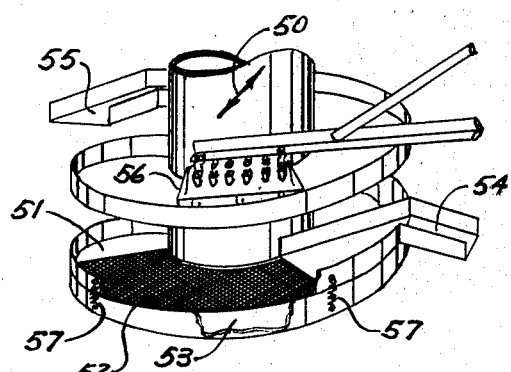

Fig. 4 is a side elevation view of a spiral conveyor having a perforate center tube from which or into which air or other gas is adapted to flow so as to sweep across the material which is being conveyed up the helical material supporting pan; and Fig. 5 is a fragmentary perspective view of a multiple flight spiral conveyor in which a portion of the top flight is in the form of a screen through which the smaller particles of the material being conveyed drop to the flight therebeneath for thus effecting separation of fines from the material being conveyed, separate discharge conduits being provided.

Figure 1:
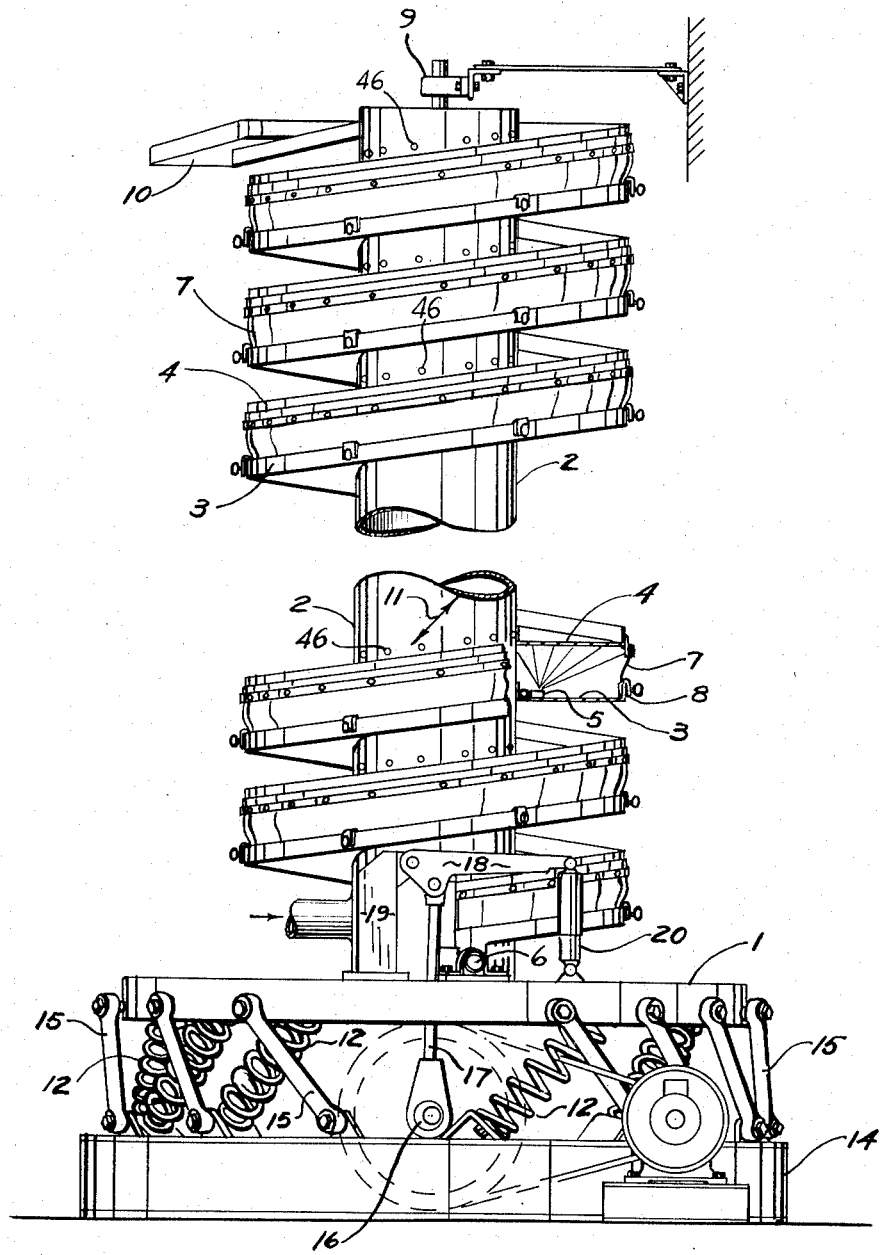
Fig. 1 is an elevation view partly in cross section showing a multiple flight spiral conveyor in which water or like coolant is adapted to be sprayed underneath the top flight, the flight therebeneath being adapted to catch the sprayed coolant for discharge from the lower end of such last-mentioned flight.

Referring now more specifically to the drawing and first to Fig. 1, the conveyor comprises a base 1 from which a center tube or hollow casing 2 projects upwardly, and winding upwardly closely proximate around said center tube are two helical pans or ascendant tracks 3 and 4. Disposed on the bottom pan 3 is a spiral water spray pipe 5 adapted to spray water as shown against the outside wall of said center tube 2 and the bottom wall of the top pan 4, the sprayed water being caught by said bottom pan 3 and conducted thereby to a discharge pipe 6 at the lower end thereof. A flexible imperforate guard 7 closes the space between said pans 3 and 4 so as to retain the water spray therebetween. Suitable clamps 8 as shown are provided at spaced intervals so that if desired the guard 7 may be lifted for cleaning, servicing, or inspection of the water spray pipe 5 and the surfaces of the pans 3 and 4.

The upper end of the conveyor may be supported in a suitable bearing 9 if desired or if necessary. The top pan 4 terminates in a discharge chute 10 at its upper end constituting a delivery zone and as evident, when the conveyor is vibrated along the generally helical path indicated by the line 11, conveyable material loaded onto the top pan at its lower end (or receiving zone) will be tossed angularly upwardly relative to the bottom of said pan and thus be conveyed upwardly around said top pan to said discharge chute 10 or delivery zone. All the while that the material is thus being conveyed, said top pan 4 is maintained at a desired predetermined temperature by reason of the aforesaid water spray whereby efficient cooling of the material will be effected and, of course, the alternate tossing and catching of the conveyed material by said top pan will maintain the material, where of granular or like form, in a finely divided state to avoid formation of lumps.

It is to be understood, of course, that if desired said bottom pan 3 may also be used for conveying material upwardly, in which case the water spray pipe 5 may be omitted and in some instances, depending upon the material being conveyed on pan 3, said water spray pipe 5 may be located around the center tube 2 so as to wet or otherwise treat such material.

The conveyor of Fig. 1 is supported and guided for vibration along the path 11 as by means of a series of circularly arranged coil springs 12 disposed obliquely between the base 1 of the conveyor and the base proper 14 of the conveyor assembly, the axes of the springs being generally parallel to such desired path of vibration. There are also provided a series of pivotally mounted rods 15 which have their upper ends pivotally connected to the conveyor base 1 and their lower ends pivotally secured to the base proper 14 whereby the arcuate paths of the upper ends of said rods 15 are substantially parallel with the desired path of vibration. Thus, said springs 12 and said rods 15 jointly support the conveyor. In order to make possible the vibration of the conveyor along the inclined arcuate path 11, the pivotal connections of the rods 15 to the conveyor base 1 and to the base proper 14 will be made through rubber bushings or the like (not shown).

Driving of the conveyor is effected as by means of an eccentric 16, which through connecting rod 17 and link 18 including bracket 19 fixed on base 1 and extensible link 20 imparts a predetermined amplitude of vibration to the conveyor at the natural frequency of said springs 12. By reason of the provision of the rods 15 the generally vertical energy impulses transmitted to the conveyor will result in the vibration of the conveyor along the inclined arcuate path 11 as shown. As is evident, when the link 20 is a hydraulic shock absorber as shown, the conveyor can gradually settle on its spring mounting according to its own weight and the load of the conveyed material without affecting the predetermined amplitude of the vibration, since at operating frequency (for example 500 cycles per minute) the shock absorber cannot alternately lengthen and shorten and thus said shock absorber constitutes in effect a rigid link which is automatically adjusted in length according to the weight of the conveyor and the load thereon.

Figure 2:
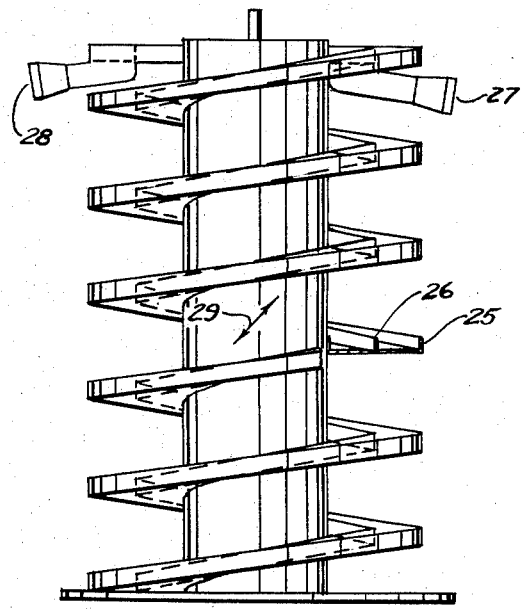
Fig. 2 is an elevation view partly in cross section to show a spiral conveyor having a split flight adapted for use in conveying different materials.

With reference to Fig. 2, the conveyor here is shown as comprising a helical flight or ascendant track 25 which is split radially by partition 26 so that different materials may be separately conveyed upwardly along the inner and outer flights thus formed by said partition and discharged through the conduits 27 and 28 respectively. This conveyor is intended to be vibrated along the generally helical path 29 by the same general type of drive means and resilient support and guide means as disclosed in Fig. 1.

Figure 3:
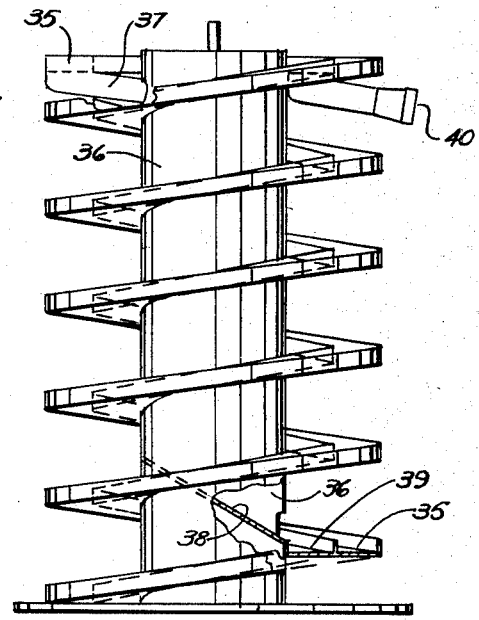
Fig. 3 is a view similar to Fig. 2 except with one flight arranged to discharge the conveyed material into the center tube of the conveyor and from the bottom of which tube the material is conveyed upwardly by the other flight.

The spiral conveyor shown in Fig. 3 is generally the same as that shown in Fig. 2 with the exception that the material conveyed upwardly by the outer flight or ascendant track 35 is discharged into the center tube 36 of the conveyor by means of the conduit 37 and at the bottom of said center tube 36 is an inclined chute 38 which discharges the material onto the lower end of the inner flight 39 wherefrom the material is again conveyed upwardly for discharge from the conduit 40 at the upper end of said inner flight. Obviously, the relationship of the inner and outer flights 39 and 35 may be readily reversed so that the material is first loaded onto the lower end of the inner flight 39 and carried thereby to the top for discharge into the center tube 36 and thence the material dropping down the center tube may be directed to the outer flight 35.

In any event, the split flight of Fig. 3 makes possible the conveying of material over relatively long distances for appropriate cooling or conditioning.

In Fig. 4 the center tube 45 of the spiral conveyor is provided with perforations or apertures 46 so that air under pressure introduced into said center tube will flow out of such perforations and sweep across the material which is being tossed forwardly and upwardly relative to the helical pan or ascendant track 47. Obviously, said center tube 45 may be communicated with a vacuum source whereby atmospheric air will sweep across the bed of material being conveyed to effect the necessary cooling or other treatment.

In Fig. 5 is shown a multiple flight conveyor which is vibrated along the path indicated by line 50, the top flight or ascendant track 51 in this case being provided with a screen 52 through which fine particles may drop to the flight 53 therebelow whereby separation of the material being conveyed is effected. Thus, the particles of the material which are too large to pass through screen 52 are conveyed upwardly by said top flight 51 for discharge from the discharge chute 54 and the fines which drop through the screen 52 will be conveyed around to a separate discharge chute 55.

If desired, a magnetic separator 56 or the like may be included in association with said flight 53 so as to separate iron or like magnetizable particles from the material which is being conveyed.

Said flight 53 for catching and conveying the fines which pass through screen 52 can start directly under the screen and continue beyond the upper end of the flight 51. Springs 57 may be employed to hold the rims of the flights 51 and 53 together in the region of the screen 52.

In connection with the Fig. 4 apparatus, it is to be noted that the gaseous medium (be it room temperature air drawn inwardly across the conveyed material through openings 46 by suction in the tube 45, or be it room temperature, hotter, or cooler air or gas flowing outwardly through the openings 46 across the conveyed material under pressure in said tube 45), simultaneously sweeps across the width of the long spiral bed of the conveyed material. It is, of course, contemplated to include such helically arranged openings 46 in the Fig. 1 apparatus so that gaseous temperature-modifying medium may sweep across the conveyed material on the upper flight 4. In this way, if additional cooling of the material is desired, the air flow across the material will effect such additional and very effective cooling owing to the simultaneous sweeping of the cooling air across the width of the entire length of the spiral bed of conveyed material.

Moreover, as clearly shown in Fig. 1, the sprayed water assists in maintaining the center tube cool so that cooling air supplied from the center tube 45 (Fig. 4) or from the center tube 2 (Fig. 1) is not preheated so as to lose effectiveness for cooling by its sweeping across the bed of the conveyed material. Similarly, the conveyors of Figs. 2, 3, and 5 may have temperature-modifying medium applied thereto as by spraying (Fig. 1) and/or by perforating the center tube wall (Fig. 4) as desired or as necessitated by the particular material undergoing treatment during conveying.

Other modes of applying the principle of the invention may be employed, change being made as regards the details described, provided the features stated in any of the following claims, or the equivalent of such, be employed.

I therefore particularly point out and distinctly claim as my invention:

1. In a vibratory conveyor for the treatment of material in discrete form for the purpose of modifying the physical condition thereof, and of the type comprising means defining a first receiving zone, means defining a second delivery zone, said two zones being in spaced superposed relationship, a hollow casing upstanding between said two zones, an ascendant track winding upwardly and closely proximate over its whole length to a bounding surface of said casing, and affording a continuous path for the transfer of the material between said two zones, and means to vibrate said track; apertures being located in said casing at points spaced apart over substantially the entire length thereof, each aperture being located above the maximum level at which material may be disposed on that portion of the track adjacent said aperture and means in communication with the interior of said casing adapted to maintain a pressure differential of a gaseous medium internally and externally of said casing in order to set up a flow of the gaseous medium through said apertures and over the ascendant track in a direction generally transversely of said track.

2. The vibratory conveyor of claim 1 wherein another ascendant track winds upwardly around said casing and is disposed in spaced relation beneath said first-mentioned track, and wherein means are provided for supplying temperature-modifying medium to contact the under surface of said first-mentioned track whereby the temperature of the material conveyed around the latter is modified, said another ascendant track serving as a conduit for conducting the spent medium to a discharge at one end thereof.

3. The vibratory conveyor of claim 2 wherein an imperforate ascendant guard member winds upwardly and extends only from the outer edge of said first-mentioned track to the outer edge of said another ascendant track to confine temperature-modifying medium in the space between said tracks, said guard member having a readily detachable portion to afford access to such space and to said means for supplying temperature-modifying medium.

References Cited in the file of this patent

UNITED STATES PATENTS

| | | |
|---|---|---|
| 1,043,158 | Simmons | Nov. 5, 1912 |
| 1,078,917 | Gray et al. | Nov. 18, 1913 |
| 2,094,785 | Flint | Oct. 5, 1937 |
| 2,374,664 | Carrier | May 1, 1945 |
| 2,464,216 | Devol | Mar. 15, 1949 |
| 2,658,609 | Weyandt | Nov. 10, 1953 |

FOREIGN PATENTS

| | | |
|---|---|---|
| 47,758 | Germany | July 12, 1889 |
| 695,938 | Germany | Sept. 6, 1940 |